United States Patent [19]

Makar et al.

[11] Patent Number: 5,178,808
[45] Date of Patent: Jan. 12, 1993

[54] END SEAL MANUFACTURE FOR CERAMIC ARC TUBES

[76] Inventors: Frank B. Makar, Rt. Hawthorne Dr., Fremont, N.H. 03044; George A. Fryburg, 15 Sunshine Dr., Kingston, N.H. 03848

[21] Appl. No.: 253,530

[22] Filed: Oct. 5, 1988

[51] Int. Cl.⁵ .............................................. C04B 37/00
[52] U.S. Cl. ........................................ 264/60; 264/332
[58] Field of Search ................................. 264/60, 332

[56] References Cited
U.S. PATENT DOCUMENTS

| | | | |
|---|---|---|---|
| 3,564,328 | 2/1971 | Bagley | 313/320 |
| 4,011,480 | 3/1977 | Jacobs | 313/217 |
| 4,160,930 | 7/1979 | Driessen | 313/217 |
| 4,283,652 | 8/1981 | Van Herck | 313/217 |
| 4,322,654 | 3/1982 | Tielemans | 313/218 |
| 4,545,799 | 10/1985 | Rhodes | 65/59:21 |
| 4,560,903 | 12/1985 | Sneijers | 313/625 |

*Primary Examiner*—James Derrington
*Attorney, Agent, or Firm*—James Theodosopoulos

[57] ABSTRACT

An end plug for an arc tube for a high pressure discharge lamp is made by pressing alumina powder in a tapered cylindrical die so that the diameter of the as-pressed plug is greatest at that part of the plug that has the lowest as-pressed density. The variation in diameter of the as-pressed plug compensates for the variation in density so that upon high temperature sintering, the plug shrinks to a substantially uniform diameter.

4 Claims, No Drawings

END SEAL MANUFACTURE FOR CERAMIC ARC TUBES

This invention concerns ceramic arc tubes for high pressure arc discharge lamps. A process for end sealing such arc tubes is disclosed in U.S. Pat. No. 3,564,328. Presintered ceramic close-fitting plugs are inserted into the ends of a presintered ceramic tube and the assembly is sintered at a high temperature to near theoretical density of the ceramic. The green densities of the plugs and tube are such that the tube shrinks more during sintering than do the plugs. Also, the sintering is at a high enough temperature to promote grain growth across the boundary between each plug and the tube. All this yields a vacuum tight monolithic seal between the plugs and the tube. Such seals are shown in U.S. Pat. Nos. 4,560,903, 4,545,799, 4,322,654, 4,283,652, 4,160,930 and 4,011,480.

A common procedure for manufacturing the plugs is the cold pressing of dry ceramic powder, as pointed out in U.S. Pat. No. 4,545,799 starting at column 1, line 67. The procedure often uses a double acting press, that is to say, there is an upper punch and a lower punch pressing the ceramic powder within a cylindrical die. A problem with such a process is that the density of the green plug can vary from top to bottom. For example the density of the plug at the upper and lower portions thereof is higher than the density at the middle. This is because the middle is farther from the punches. The result of such a density variation is that the plug does not shrink uniformly upon sintering. For example, plugs that were cold pressed to an outside diameter (OD) of 387 mils, an inside diameter (ID) of 222 mils and a thickness of 145 mils showed an average variation in OD after sintering of 2.8 mils, the diameter at the middle being the smallest because of greater shrinkage there. Such a variation interferes with grain growth across the boundary for the full thickness of the plug and can lead to premature failure of the arc tube.

This invention discloses a process for making the end plugs which reduces the variation in OD after sintering. In this process, a single punch is used in pressing the ceramic powder. Also, the die is tapered so that the part of the plug that shrinks the most upon sintering has the greatest green diameter, that is to say, the greatest diameter as pressed.

In one example, the apparatus for pressing the end plugs consisted of a cylindrical die closed at one end by means of a removable anvil and having a punch at the other end close-fitting in the die. The die was filled with alumina powder which was then pressed to a green density of about 2 grams per cc. There was a removable axially disposed rod within the die to provide a center hole in the plug to accommodate a discharge electrode in the finished arc tube. The die was tapered to provide the largest diameter at the end opposite the punch. Thus, the plug had to be removed from the die at the anvil end.

In plugs made in accordance with this invention having the above-described as-pressed measurements, that is, OD of 387 mils, ID of 222 mils, thickness of 145 mils, a three mil taper was provided in the die. Thus, the plug as pressed had a diameter at the end farthest from the punch that was about 3 mils greater than the diameter at the other end. After sintering, the average variation in OD of the plugs was 1.6 mils, an improvement of about 43%.

In one example of an arc tube for a 400 watt high pressure sodium lamp, end plugs were dry pressed from fine alumina powder as per this invention in a cylindrical die having a three mil taper to a pressed dimension of 387 mils OD, 222 mils ID, 145 mils thick. The powder had a 50% particle size in the range of 0.6 to 0.8 micron and a surface area of six square meters per gram. The arc tube was Isostaticly pressed from finer alumina powder having a 50% particle size in the range of 0.3 to 0.8 micron and a surface area of 24 square meters per gram. The end plugs pressed to a density of 2.0 grams/cc while the arc tube pressed to a density of 1.6 grams/cc. Consequently, the arc tube would shrink more than the end plugs during sintering to provide the shrink fit of the arc tube onto the end plugs. An as-pressed end plug was inserted into each end of an as-pressed arc tube and the assembly was sintered in air at 1280° C. for five hours. This resulted in some shrinkage of the assembly and burned out any binder material. Next, the assembly was sintered in hydrogen at 1830° C. for four hours. Shrinkage of about 20% occurred during this final sintering step and densified the alumina to near its theoretical density of 3.99 grams/cc. Also grain growth occurred across the end plug-arc tube boundary to provide the desired monolithic seal. The excess length of the arc tube was then removed and the arc tube was processed into a finished lamp.

We claim:

1. In the manufacture of an arc tube for an arc discharge lamp, the steps comprising: providing pressing apparatus consisting of a tapered cylindrical die closed at one end by a removable anvil and having a close fitting punch at the other end, the die being tapered so that its largest diameter is at the anvil end; filling the die with alumina powder; pressing the powder into the shape of an end plug; removing the as-pressed end plug from the die at the anvil end; pressing alumina powder into the shape of an open ended arc tube, the as-pressed arc tube having a lower density than that of the as-pressed end plug; inserting an end plug into each end of the arc tube; and sintering the arc tube-end plug assembly at a high enough temperature to form a vacuum-tight monolithic seal between the end plugs and the arc tube.

2. The method of claim 1 wherein the alumina powder used in pressing the arc tube has greater surface area per gram of powder than that of the alumina powder used in pressing the end plugs.

3. The method of claim 1 wherein the sintering step is at a temperature of 1830° C.

4. The method of claim 1 wherein the arc tube-end plug assembly is first sintered at 1280° C. in air before sintering at said high enough temperature.

* * * * *